(12) United States Patent
Jiang

(10) Patent No.: US 11,926,729 B2
(45) Date of Patent: Mar. 12, 2024

(54) IONOMER COMPOSITIONS

(71) Applicant: Dow Global Technologies LLC, Midland, MI (US)

(72) Inventor: Xian Jiang, Newark, DE (US)

(73) Assignee: Dow Global Technologies LLC, Midland, MI (US)

(*) Notice: Subject to any disclaimer, the term of this patent is extended or adjusted under 35 U.S.C. 154(b) by 389 days.

(21) Appl. No.: 17/260,068

(22) PCT Filed: Jul. 15, 2019

(86) PCT No.: PCT/US2019/041801
§ 371 (c)(1),
(2) Date: Jan. 13, 2021

(87) PCT Pub. No.: WO2020/028023
PCT Pub. Date: Feb. 6, 2020

(65) Prior Publication Data
US 2021/0277215 A1 Sep. 9, 2021

Related U.S. Application Data

(60) Provisional application No. 62/712,525, filed on Jul. 31, 2018.

(51) Int. Cl.
C08L 23/08 (2006.01)
C08F 210/02 (2006.01)
(Continued)

(52) U.S. Cl.
CPC ........ *C08L 23/0876* (2013.01); *C08F 210/02* (2013.01); *C08F 220/06* (2013.01); *C08F 220/1804* (2020.02); *C08K 5/09* (2013.01)

(58) Field of Classification Search
CPC .... C08L 23/0876; C08L 33/02; C08F 210/02; C08F 220/06; C08F 220/1804; C08F 220/14; C08K 5/09; C08K 5/098
See application file for complete search history.

(56) References Cited

U.S. PATENT DOCUMENTS 3,264,272 A 8/1966 Watkin
4,351,931 A 9/1982 Armitage
(Continued)

FOREIGN PATENT DOCUMENTS

DE 1255305 B 11/1967
EP 1080141 B1 8/2002
GB 1113409 A * 5/1968 ............ C08F 210/02

OTHER PUBLICATIONS

Office Action dated Aug. 16, 2022, pertaining to IN Patent Application No. 202117004505, 4 pgs.
(Continued)

*Primary Examiner* — Marc S Zimmer
*Assistant Examiner* — Surbhi M Du
(74) *Attorney, Agent, or Firm* — Dinsmore & Shohl LLP

(57) ABSTRACT

Described in embodiments herein are ionomers comprising a neutralized blend of an ethylene acid copolymer, an aliphatic and a mono-functional organic acid. The blend includes from 40 wt % to 95 wt % of the ethylene acid copolymer, from 5 to 50 wt % of the aliphatic, mono-functional organic acid, based on the total weight of the blend. The ethylene acid copolymer is the polymerized reaction product of ethylene, from 1 to 25 wt % of monocarboxylic acid and from 1 to 40 wt % of alkyl acrylate, based on the total weight of the monomers present in the ethylene acid copolymer. The aliphatic, mono-functional organic acid has fewer than 36 carbon atoms. In various embodiments, at least 70 mole % of total acid units are neutralized with both a trivalent cation and either a mono- or di-valent cation.

19 Claims, 2 Drawing Sheets

(51) Int. Cl.
    *C08F 220/06*     (2006.01)
    *C08F 220/18*     (2006.01)
    *C08K 5/09*     (2006.01)

(56) References Cited

U.S. PATENT DOCUMENTS

| | | |
|---|---|---|
| 4,766,174 A | 8/1988 | Statz |
| 5,028,674 A | 7/1991 | Hatch et al. |
| 5,057,593 A | 10/1991 | Marshall et al. |
| 6,653,382 B1 * | 11/2003 | Statz .................. C08L 23/08 |
| | | 524/400 |
| 7,829,197 B2 | 11/2010 | Chen et al. |
| 8,420,176 B2 | 4/2013 | Chen et al. |
| 2002/0091188 A1 * | 7/2002 | Statz .................. C08L 77/12 |
| | | 524/400 |
| 2003/0050373 A1 * | 3/2003 | Chen .............. A63B 37/0003 |
| | | 524/322 |
| 2005/0148725 A1 | 7/2005 | Statz et al. |
| 2006/0063888 A1 * | 3/2006 | Dean ................... A61L 15/24 |
| | | 521/142 |
| 2007/0020416 A1 | 1/2007 | Dean |
| 2010/0304893 A1 | 12/2010 | De Garavilla |

OTHER PUBLICATIONS

Translation of Chinese Office Action dated Aug. 11, 2022, pertaining to CN Patent Application No. 201980046718.5, 5 pgs.
International Search Report and Written Opinion pertaining to PCT/US2019/041801, dated Sep. 24, 2019.

* cited by examiner

IONOMER COMPOSITIONS

CROSS-REFERENCE TO RELATED APPLICATIONS

This application is a National Stage Entry under 35 U.S.C. § 371 of International Patent Application No. PCT/US2019/041801, filed Jul. 15, 2019, which claims priority to U.S. Provisional Patent Application 62/712,525, filed on Jul. 31, 2018, the entire disclosures of which are hereby incorporated by reference.

TECHNICAL FIELD

Embodiments of the present disclosure are generally related to ionomers, and are specifically related to ionomers including a neutralized blend of an ethylene acid copolymer and an aliphatic, mono-functional organic acid.

BACKGROUND

Ionomers are known to have resiliency and foamability that make them suitable for use as footwear midsoles and other foam applications. However, conventional ionomer compositions can lack dimensional stability and creep resistance at elevated temperatures, which can limit the practical applications for which they can be used. To improve the creep resistance, ionomers have been blended with other high temperature materials. However, the blends have limited resiliency and foamability.

Accordingly, there is a need for alternative ionomers that can be used for high temperature foam applications.

SUMMARY

Disclosed in embodiments herein are ionomers. The ionomers comprise a neutralized blend of an ethylene acid copolymer, an aliphatic, mono-functional organic acid, and a neutralizing composition. The blend includes from 40 wt % to 95 wt % of the ethylene acid copolymer, from 5 to 50 wt % of the aliphatic, mono-functional organic acid, based on the total weight of the blend. The ethylene acid copolymer is the polymerized reaction product of ethylene, from 1 to 25 wt % of monocarboxylic acid and from 1 to 40 wt % of alkyl acrylate, based on the total weight of the monomers present in the ethylene acid copolymer. The aliphatic, mono-functional organic acid has fewer than 36 carbon atoms. In various embodiments, at least 70 mole % of total acid units are neutralized with both a trivalent cation and either a mono- or di-valent cation.

DETAILED DESCRIPTION

Figure 1:
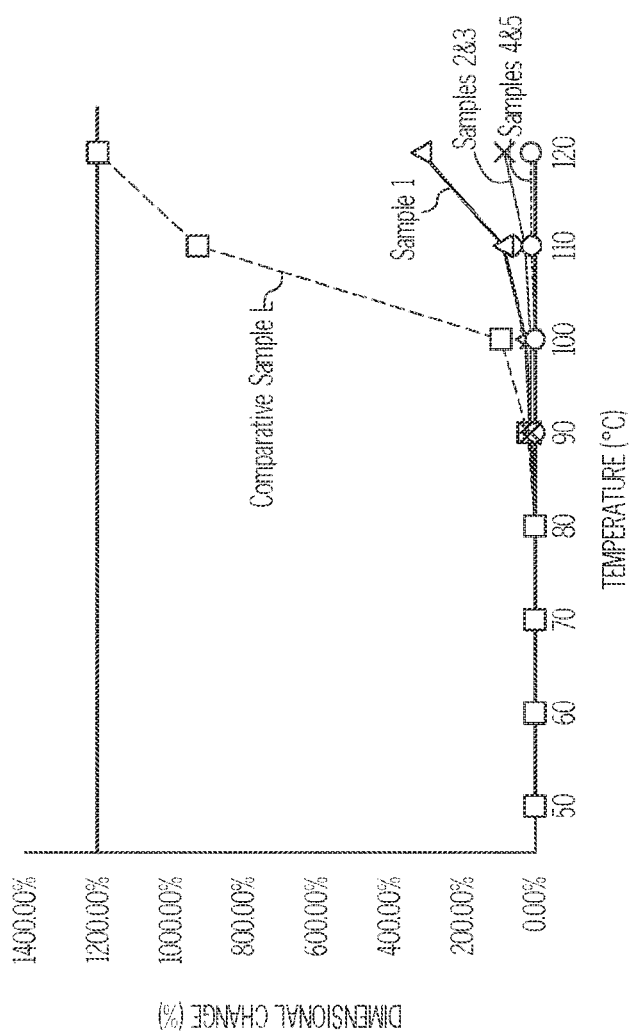
FIG. 1 is a graph of the dimensional change (y-axis; %) of Comparative Sample L and Samples 1-5 over a temperature of from 50° C. to 120° C. with a load of 30 g.

Unless otherwise defined, all technical and scientific terms used herein have the same meaning as commonly understood by one of ordinary skill in the art to which this disclosure belongs. In case of conflict, the specification, including definitions, will control.

Although methods and materials similar or equivalent to those described herein can be used in the practice or testing of various embodiments, suitable methods and materials are described herein.

Unless stated otherwise, all percentages, parts, ratios, etc., are by weight. When an amount, concentration, or other value or parameter is given as either a range, preferred range, or a list of lower preferable values and upper preferable values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having," or any other variation thereof, are intended to cover a non-exclusive inclusion. For example, a process, method, article, or apparatus that comprises a list of elements is not necessarily limited to those elements but may include other elements not expressly listed or inherent to such process, method, article, or apparatus. Further, unless expressly stated to the contrary, "or" refers to an inclusive or and not to an exclusive or.

The transitional phrase "consisting essentially of" limits the scope of a claim to the specified materials or steps and those that do not materially affect the basic and novel characteristic(s) of the disclosure. Where applicants have defined an embodiment or a portion thereof with an open-ended term such as "comprising," unless otherwise stated, the description should be interpreted to also describe such an embodiment using the term "consisting essentially of."

Use of "a" or "an" are employed to describe elements and components of various embodiments. This is merely for convenience and to give a general sense of the various embodiments. This description should be read to include one or at least one and the singular also includes the plural unless it is obvious that it is meant otherwise.

In describing certain polymers, it should be understood that sometimes applicants are referring to the polymers by the monomers used to produce them or the amounts of the monomers used to produce the polymers. While such a description may not include the specific nomenclature used to describe the final polymer or may not contain product-by-process terminology, any such reference to monomers and amounts should be interpreted to mean that the polymer comprises copolymerized units of those monomers or that amount of the monomers, and the corresponding polymers and compositions thereof.

The term "copolymer" is used to refer to polymers formed by copolymerization of two or more monomers. Such copolymers include dipolymers consisting essentially of two copolymerized monomers.

"(Meth)acrylic acid" includes methacrylic acid and/or acrylic acid and "(meth)acrylate" includes methacrylate and/or acrylate.

Various embodiments are directed to an ionomer including a neutralized blend of an ethylene acid copolymer, an aliphatic and a mono-functional organic acid. The blend includes from 40 wt % to 95 wt % of the ethylene acid copolymer, from 5 to 50 wt % of the aliphatic, monofunctional organic acid, based on the total weight of the blend. The ethylene acid copolymer is the polymerized reaction product of ethylene, from 1 to 25 wt % of monocarboxylic acid and from 1 to 40 wt % of alkyl acrylate, based on the total weight of the monomers present in the ethylene acid copolymer. The aliphatic, mono-functional organic acid has fewer than 36 carbon atoms. In various embodiments, at least 70 mole % of total acid units are neutralized with both a trivalent cation and either a mono- or di-valent cation.

In various embodiments, the ionomer exhibits improved creep resistance at elevated temperatures while maintaining their resiliency and foamability. Molded articles including ionomers in accordance with various embodiments described herein exhibit a creep resistance as defined by a dimensional change less than 50% at 100° C. under a load of 30 g at a stress of 46 kPa after 30 minutes, less than 200% at 100° C. under a load of 100 g at a stress of 150 kPa after 30 minutes, less than 15% at 100° C. under a load of 100 g at a stress of 150 kPa after 30 minutes, or less than 500% at 50° C. under a load of 400 g at a stress of 600 kPa after 96 hours.

The ethylene acid copolymer is a polymerized reaction product of ethylene, a monocarboxylic acid, and a softening comonomer. The monocarboxylic acid can be, for example, acrylic acid, methacrylic acid, or combinations thereof. In various embodiments, the monocarboxylic acid is present in an amount of from about 1 wt % to about 25 wt %, from about 1 wt % to about 20 wt %, or from about 5 wt % to about 15 wt % based on the total weight of the monomers present in the ethylene acid copolymer. In various embodiments, the ethylene content of the ethylene acid copolymer is greater than about 40 wt %, greater than about 50 wt %, or greater than about 60 wt %. For example, the ethylene content of the ethylene acid copolymer is from about 40 wt % to about 95 wt %, from about 40 wt % to about 90 wt %, from about 50 wt % to about 85 wt %, or from about 60 wt % to about 80 wt %.

In various embodiments, the ethylene acid copolymer includes a softening comonomer selected from the group consisting of vinyl esters, alkyl vinyl esters, and alkyl (meth)acrylates. The softening comonomer may be present in an amount from about 1 wt % to about 40 wt % or about 1 wt % to about 30 wt %, based on the total weight of the monomers present in the ethylene acid copolymer. In some embodiments, the softening comonomer is alkyl acrylate. The alkyl acrylate may be present in an amount from about 1 wt % to about 40 wt % or from about 1 wt % to about 30 wt %, based on the total weight of the monomers present in the ethylene acid copolymer. Suitable examples of alkyl acrylates include, but are not limited to, ethyl acrylate, methyl acrylate, n-butyl acrylate, iso-butyl acrylate, or combinations thereof. In various embodiments, the alkyl acrylate has an alkyl group with from 1 to 8 carbons. In particular embodiments, the alkyl acrylate is n-butyl acrylate.

The ethylene acid copolymer can be prepared by standard free-radical copolymerization methods, using high pressure, operating in a continuous manner. Monomers are fed into the reaction mixture in a proportion which relates to the monomer's activity, and the amount desired to be incorporated. In this way, uniform, near-random distribution of monomer units along the chain is achieved. Unreacted monomers may be recycled. Additional information on the preparation of ethylene acid copolymers including the softening monomer can be found in U.S. Pat. Nos. 3,264,272 and 4,766,174, each of which is hereby incorporated by reference in its entirety.

In various embodiments, the neutralized blend includes from about 40 to about 95 wt % of the ethylene acid copolymer or from about 50 to about 80 wt % ethylene acid copolymer, based on a total weight of the blend.

The ethylene acid copolymer can be used to produce ionomers by treatment with mono- or divalent cations. The source of the mono- or divalent metal cations can be any convenient derivative, including but not limited to formates, acetates, hydroxides, nitrates, carbonates, and bicarbonates. In various embodiments, the ethylene acid copolymer can be treated with one or more cations of magnesium, sodium, or zinc. In embodiments, from about 1% to about 70%, from about 5% to about 60%, or from about 10% to about 55% of the total acid units of the ethylene acid copolymer are neutralized with mono- or di-valent cations. Commercially available ionomers include those available under the tradename Surlyn® from E. I. du Pont de Nemours and Company.

In various embodiments described herein, the ionomer is a fatty acid modified ionomer (FAMI). In particular, according to various embodiments, the ethylene acid copolymer is modified with an aliphatic, mono-functional organic acid. In various embodiments, the aliphatic, mono-functional organic acid has fewer than 36 carbon atoms. For example, the fatty acid can include $C_4$ to less than $C_{36}$, such as $C_{34}$, $C_{4-26}$, $C_{6-22}$, or $C_{12-22}$ or salts thereof. At high neutralization such as at least 70% up to 80%, nominal neutralization (i.e., sufficient metal compound is added such that all acid moieties in the copolymer and organic acid are nominally neutralized), volatility is not an issue and organic acids with lower carbon content may be used, though it is preferred that the organic acid (or salt) be non-volatile (not volatilize at temperatures of melt blending of the agent with the acid copolymer) and non-migratory (not bloom to the surface of the polymer under normal storage conditions (ambient temperatures)). The fatty acid can be present in the blend from about 5 wt % to about 50 wt %, from about 5 wt % to about 40 wt %, or from about 15 wt % to about 35 wt % based on the total weight of the blend. Examples of fatty acids include, but are not limited to, caproic acid, caprylic acid, capric acid, lauric acid, palmitic acid, stearic acid, isostearic acid, behenic acid, erucic acid, oleic acid, linoleic acid, isostearic acid, 12-hydroxystearic acid, or combinations of two or more thereof.

Salts of any of these fatty acids may include one or more alkali metal salts, including sodium salts, potassium salts, or both. Small amounts of salts of alkaline earth metal and/or transition metal ions may be present in addition to alkali metal salts. In some embodiments, salts of the fatty acids may include the mono- or divalent metal cations described above, thereby modifying the ionomer during treatment with the metal cation to form the fatty acid modified ionomer ("FAMI").

In various embodiments, the FAMI can be further neutralized by blending a melt of the FAMI with a neutralizing composition that includes metal cations including trivalent cations, such as aluminum, chromium, iron, or lanthanide metal cations. The metal cations may be present in the neutralizing composition in the form of metal salts or other metal compounds that provide metal cations. In embodiments in which the neutralizing solution includes metal salts, the metal cations are provided in the ionomer, and the anion of the salt is evaporated off from the polymer. In various embodiments, the neutralizing composition includes an aluminum cation. The source of aluminum cation can be any convenient derivative, including but not limited to carboxylates, alkoxides, chelated compounds, and hydroxides. For example, the aluminum cation source may be aluminum acetate, aluminum isopropoxide, or aluminum acetylacetonate. In embodiments in which a trivalent cation other than aluminum is used, convenient derivatives thereof can be employed.

Neutralization may occur by first neutralizing the blend with a trivalent cation, followed by a second neutralization step using a mono- or di-valent cation. Neutralization may also occur by first neutralizing the blend with a mono- or di-valent cation, followed by a second neutralization step using a trivalent cation. Although in various embodiments neutralization of the blend is described as being a two-step neutralization process, it is also contemplated that, in some embodiments, the blend can be neutralized in a single step neutralization process where a neutralization composition comprises (i) a mono- or divalent cation and (ii) a trivalent cation, which is then used to neutralize the blend.

Accordingly, in various embodiments, at least 70 mole % of the total acid units are neutralized with trivalent cations, at least 80 mole % of the total acid units are neutralized with trivalent cations, at least 90 mole % of the total acid units are neutralized with trivalent cations, at least 95 mole % of the total acid units are neutralized with trivalent cations, or even 100 mole % of the total acid units are neutralized with trivalent cations.

In the context of this disclosure, the percent neutralization data is presented using the assumption that each cation will react with the maximum number of carboxylic acid groups calculated from its ionic charge. That is, it is assumed, for example, that $Al^{3+}$ will react with three carboxylic acid groups, that $Mg^{2+}$ and $Zn^{2+}$ will react with two, and that $Na^+$ will react with one.

In various embodiments, 100 mole % of the total acid units are neutralized using an amount of the cation source in excess of the amount required to neutralize 100 mole % of the total acid units. The neutralization level can be calculated according to the following equation:

$$\text{Neutralization Level} = \frac{\text{total cation valence}}{\text{total acid valence}} \times 100\%$$

The blend can be produced by any means known to one skilled in the art. It is substantially melt-processable and can be produced by combining one or more ethylene acid copolymers or ionomers of the ethylene acid copolymers, one or more fatty acids or salts thereof, a basic metal compound, and a neutralizing composition including a trivalent metal cation to produce a mixture and heating the mixture under a condition sufficient to produce the composition. Heating can be carried out under a temperature in the range of from about 80° C. to about 350° C., from about 120° C. to about 300° C., or from about 160° C. to about 260° C. under a pressure that accommodates the temperature for a period from about 30 seconds to about 2 or 3 hours. The blend can be produced by melt-blending an ethylene acid copolymer and/or ionomer thereof with one or more fatty acids or salts thereof and concurrently or subsequently combining a sufficient amount of a basic metal compound and a trivalent metal cation. A salt blend of components can be made or the components can be melt-blended in an extruder. For example, a Werner & Pfleiderer twin-screw extruder can be used to mix and treat the ethylene acid copolymer and the organic acid (or salt) with the metal compound at the same time.

The blend can additionally include small amounts of additives including plasticizers, stabilizers including viscosity stabilizers, hydrolytic stabilizers, primary and secondary antioxidants, ultraviolet light absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. Inorganic fillers, such as calcium carbonate, and the like can also be incorporated into the blend.

These additives may be present in the blends in quantities ranging from 0.01 to 40 wt %, 0.01 to 25 wt %, 0.01 to 15 wt %, 0.01 to 10 wt %, or 0.01 to 5 wt %. The incorporation of the additives can be carried out by any known process such as, for example, by dry blending, by extruding a mixture of the various constituents, by the conventional masterbatch technique, or the like.

In various embodiments, the resulting ionomer has a melt index, $I_2$, of from about 0.1 to about 30.0 g/10 min, as determined in accordance with ASTM D1238 (220° C., 2.16 kg). In some embodiments, the resulting ionomer has a melt index, $I_2$, of from about 0.1 to about 20.0 g/10 min, as determined in accordance with ASTM D1238 (220° C., 2.16 kg). Additionally, the ionomer has a density of from about 0.920 to about 0.980 g/cc as determined in accordance with ASTM D792.

Without being bound by theory, it is believed that the at least partially neutralized trivalent cation containing ionomers, and in particular, aluminum-containing ionomers, lead to substantially improved properties of foams when compared to neutralized ionomers containing only mono- and divalent metal cations. For example, foams including the at least partially neutralized trivalent cation containing ionomers exhibit improved dimensional stability and creep resistance at elevated temperatures as compared to neutralized ionomers containing only mono- and divalent metal cations while maintaining resiliency and foamability.

According to various embodiments, the ionomer can be used to form a foam or molded article. For example, in embodiments, the ionomer can be combined with an additives used to control foam properties to form foams of various shapes. In some embodiments, the foam may be extruded, such as from a twin screw extruder, as is known to those of ordinary skill in the art.

Foaming agents (also referred to as blowing agents) used in the manufacture of foams can be physical foaming agents or chemical foaming agents. As used herein, "physical foaming agents" are low-boiling liquids which volatilize under the curing conditions to form the blowing gas. Exemplary physical foaming agents include hydrocarbons, fluorocarbons, hydrofluorocarbons, hydrofluoroolefins, hydrochlorofluoroolefins, and other halogenated compounds. Other suitable chemical foaming agents can include, for example, sodium bicarbonate, ammonium bicarbonate, azodicarbonamide, dinitrosopentamethylenediamine, and sulfonyl hydrazides. Foaming agents such as water or carbon dioxide added as a gas or liquid, or generated in-situ by the reaction of water with polyisocyanate, may also be used. The foaming agents can be used in mixtures of two or more, and chemical and physical foaming agents can be used together to tailor expansion-decomposition temperature and foaming processes.

The foam composition can further include a free radical initiator or crosslinking agents, co-curing agents, an activator, and any other type of additive typically used in similar compositions, including but not limited to pigments, adhesion promoters, fillers, nucleating agents, rubbers, stabilizers, and processing aids.

Free radical initiators or crosslinking agents can include, by way of example and not limitation, organic peroxides such as dialkyl organic peroxides. Example organic peroxides suitable for use include 1,1-di-t-butyl peroxy-3,3,5-trimethylcyclohexane, t-butyl-cumyl peroxide, dicumyl-peroxide, 2,5-dimethyl-2,5-di(tertiary-butyl-peroxyl)hexane, 1,3-bis(tertiary-butyl-peroxyl-isopropyl)benzene, or combinations of two or more thereof.

Co-curing agents include trimethyl propane triacrylate (and similar compounds), N,N-m-phenylenedimaleimide, triallyl cyanurate, or combinations of two or more thereof.

Activators can include activators for the blowing agent, and can include one or more metal oxides, metal salts, or organometallic complexes. Examples include ZnO, Zn stearate, MgO, or combinations of two or more thereof.

The foam may be produced by a number of methods, such as compression molding, injection molding, and hybrids of extrusion and molding. The process can include mixing the components of the foam composition under heat to form a melt. The components may be mixed and blended using any technique known and used in the art, including Banbury, intensive mixers, two-roll mills, and extruders. Time, temperature, and shear rate can be regulated to ensure dispersion without premature crosslinking or foaming.

After mixing, shaping can be carried out. Sheeting rolls or calendar rolls can be used to make appropriately dimensioned sheets for foaming. An extruder may be used to shape the composition into pellets.

Foaming can be carried out in a compression mold at a temperature and time to complete the decomposition of peroxides and blowing agents. Pressures, molding temperature, and heating time can be controlled. Foaming can be carried out using injection molding equipment by using pellets made from the foam composition. The resulting foam can be further shaped to the dimension of finished products by any means known and used in the art, including thermoforming and compression molding.

In various embodiments, the resulting polymer foam composition can be substantially closed cell and useful for a variety of articles, e.g., footwear applications including midsoles or insoles.

EXAMPLES

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples. Further, a description of the raw materials used in the examples is as follows:

Example 1 ionomer ("Ex. 1.") is an ethylene/15 wt % methacrylic acid copolymer partially neutralized using zinc cations, the ionomer having a density of 0.97 g/cm 3 measured in accordance with ASTM D792 and a melt index, $I_2$, of 0.7 g/10 min as determined in accordance with ASTM D1238 (190° C., 2.16 kg).

Example 2 ionomer ("Ex. 2") is a blend of 62 wt % ethylene acid copolymer and 38 wt % of oleic acid. The ethylene acid copolymer is the polymerized reaction product of ethylene/6.2 wt % acrylic acid/28 wt % n-butyl acrylate terpolymer. The total acid units are neutralized with magnesium cations.

The ionomers of Ex. 1 and Ex. 2 may be prepared by standard neutralization techniques, as disclosed in U.S. Pat. No. 3,264,272 (Rees), which is hereby incorporated by reference. The ethylene acid copolymer, the first ethylene acid copolymer, and the second ethylene acid copolymer of this disclosure may be prepared by standard free-radical copolymerization methods, using high pressure, operating in a continuous manner. Monomers are fed into the reaction mixture in a proportion which relates to the monomer's reactivity, and the amount desired to be incorporated. In this way, uniform, near-random distribution of monomer units along the chain is achieved. Polymerization in this manner is well known, and is described in U.S. Pat. No. 4,351,931 (Armitage), which is hereby incorporated by reference. Other polymerization techniques are described in U.S. Pat. No. 5,028,674 (Hatch et al.) and U.S. Pat. No. 5,057,593 (Statz), both of which are also hereby incorporated by reference.

Example 1

Table 1 below lists Comparative Samples A-K, which are eleven example embodiments of the formulations that include Ex. 1. The amounts reported in Table 1 represent the actual amount of metal (Zn, Al) salts compounded with Ex. 1 and the corresponding additional neutralization of each ionomer.

TABLE 1

| | Compounded Ex. 1 | | | |
| --- | --- | --- | --- | --- |
| Sample | Aluminum Acetyl-acetonate (wt %) | Final Neutralization (mole %) | Zinc Acetyl-acetonate (wt %) | Final Neutralization (mole %) |
| Comparative Sample A | 0% | 61% | 0% | 61% |
| Comparative Sample B | N/A | N/A | 0.5% | 63% |
| Comparative Sample C | N/A | N/A | 1.1% | 66% |
| Comparative Sample D | N/A | N/A | 1.6% | 69% |
| Comparative Sample E | N/A | N/A | 2.7% | 73% |
| Comparative Sample F | N/A | N/A | 3.3% | 76% |
| Comparative Sample G | 0.4% | 63% | N/A | N/A |
| Comparative Sample H | 0.9% | 66% | N/A | N/A |
| Comparative Sample I | 1.3% | 69% | N/A | N/A |
| Comparative Sample J | 2.2% | 73% | N/A | N/A |
| Comparative Sample K | 2.6% | 76% | N/A | N/A |

Comparative Samples A-K were made by compounding Ex. 1 through a 26 mm twin screw extruder. The barrel temperature was set around 230-240° C. and the actual melt temperature was measured at about 260-265° C. The components were pre-mixed by tumble mixing ingredients in a polyethylene bag and were then fed into the twin extruder. The calculated value in the table for percentage of additional neutralization by $Al^{3+}$ for Comparative Samples G-K assume that all of the aluminum ions form trivalent salts with the ionomer carboxylic acid groups. For Comparative Samples B-F, Ex. 1 was compounded with zinc acetylacetonate at the same neutralization level as $Al^{3+}$ for comparison and to exclude the possibility that property change could be due to a different neutralization level.

The melt viscosity was measured for Comparative Samples A-K at high (2000 $s^{-1}$) and low (10 $s^{-1}$) shear rates and 220° C., which is listed in Table 2. The viscosity data was acquired using a Kayeness Capillary Rheometer. The cylindrical capillary die has dimensions of 30 mm long with a diameter of 1 mm (L/D=30). A pre-heat dwell time of 5 minutes was used before beginning the viscosity test. At both low and high shear rates, the viscosity of the Comparative Samples neutralized with $Al^{3+}$ (Comparative Samples G-K) increased much more significantly over the viscosity of the Comparative Samples neutralized with $Zn^{2+}$. Without being bound by theory, it is believed that the increase in viscosity is the result of the formation of trivalent bonds.

TABLE 2

Melt Viscosity for Comparative Sample A to Sample K at 220° C.

| Additional Neutralization by $Zn_2+$ | Viscosity (Pa * s) at 10 $s^{-1}$ | Viscosity (Pa * s) at 2000 $s^{-1}$ | Additional Neutralization by $Al_3+$ | Viscosity (Pa * s) at 10 $s^{-1}$ | Viscosity (Pa * s) at 2000 $s^{-1}$ |
|---|---|---|---|---|---|
| Comparative Sample A | 2518.2 | 261.8 | Comparative Sample A | 2518.2 | 261.8 |
| Comparative Sample B | 2753.6 | 229.8 | Comparative Sample G | 2582.4 | 256.4 |
| Comparative Sample C | 3245.8 | 252.6 | Comparative Sample H | 3616.8 | 305.3 |
| Comparative Sample D | 2297.1 | 226.1 | Comparative Sample I | 4009.2 | 323.6 |
| Comparative Sample E | 2825.0 | 284.3 | Comparative Sample J | 6427.5 | 490.0 |
| Comparative Sample F | 4587.0 | 357.5 | Comparative Sample K | 9537.8 | 563.4 |

Example 2

Next, Samples 1-7 were made by compounding Ex. 2 with aluminum acetylacetonate according to the method described above. Comparative Sample L is Ex. 2 with no additional neutralization. The amounts reported in Table 3 represent the additional neutralization of each ionomer as well as the actual amount of Aluminum Acetylacetonate when compounded with Ex. 2.

TABLE 3

Compounded Ex. 2

| Sample | Aluminum Acetylacetonate (wt %) | Final Neutralization (mole %) | Melt Index (I2, 220° C. and 2.16 kg) (g/10 min) |
|---|---|---|---|
| Comparative Sample L | 0% | >100% | 15.7 |
| Sample 1 | 1.0 wt % | >100% | 12.6 |
| Sample 2 | 1.5 wt % | >100% | 8.6 |
| Sample 3 | 2.0 wt % | >100% | 7.5 |
| Sample 4 | 2.5 wt % | >100% | 6.0 |
| Sample 5 | 3.0 wt % | >100% | 3.7 |
| Sample 6 | 7.0 wt % | >100% | 0.9 |
| Sample 7 | 11.0 wt % | >100% | 0.2 |

The melt viscosity was measured for Comparative Sample L and Samples 2, 4, and 5 at high (3000 $s^{-1}$) and low (10 $s^{-1}$) shear rates. The results are reported in Table 4.

TABLE 4

Melt Viscosity for Comparative Sample L and Samples 2, 4, and 5 at 220° C.

| | Viscosity (Pa * s) at 10 $s^{-1}$ | Viscosity (Pa * s) at 3000 $s^{-1}$ |
|---|---|---|
| Comparative Sample L | 1169.9 | 101.3 |
| Sample 2 | 2425.5 | 143.9 |
| Sample 4 | 3146.0 | 188.2 |
| Sample 5 | 3766.6 | 206.4 |

As shown in Table 4, at both low and high shear rates, the viscosity of the Samples neutralized with $Al^{3+}$ (Samples 2-5) increased over the viscosity of the Comparative Sample L. In particular, the viscosity of the ionomers increases quickly and significantly, demonstrating the successful incorporation of $Al^{3+}$ to form trivalent bonds.

Creep resistance of Comparative Sample L and Samples 1-5 was measured by measuring the dimensional change (vertical) of a press molded film (10 mil) attached to a deadload in a heated oven. The load was 30 g and the dimensional change was measured as the oven temperature increased 10° C. per 30 minutes. Test failure occurs if the film elongates to the point of touching the bottom of the oven (i.e., 1200% dimensional change). The test results are reported in FIG. 1.

Creep resistance was also measured for Comparative Sample L and Samples 1-7 using a load of 100 g. The dimensional change was measured and the results are reported in FIG. 2.

Figure 2:
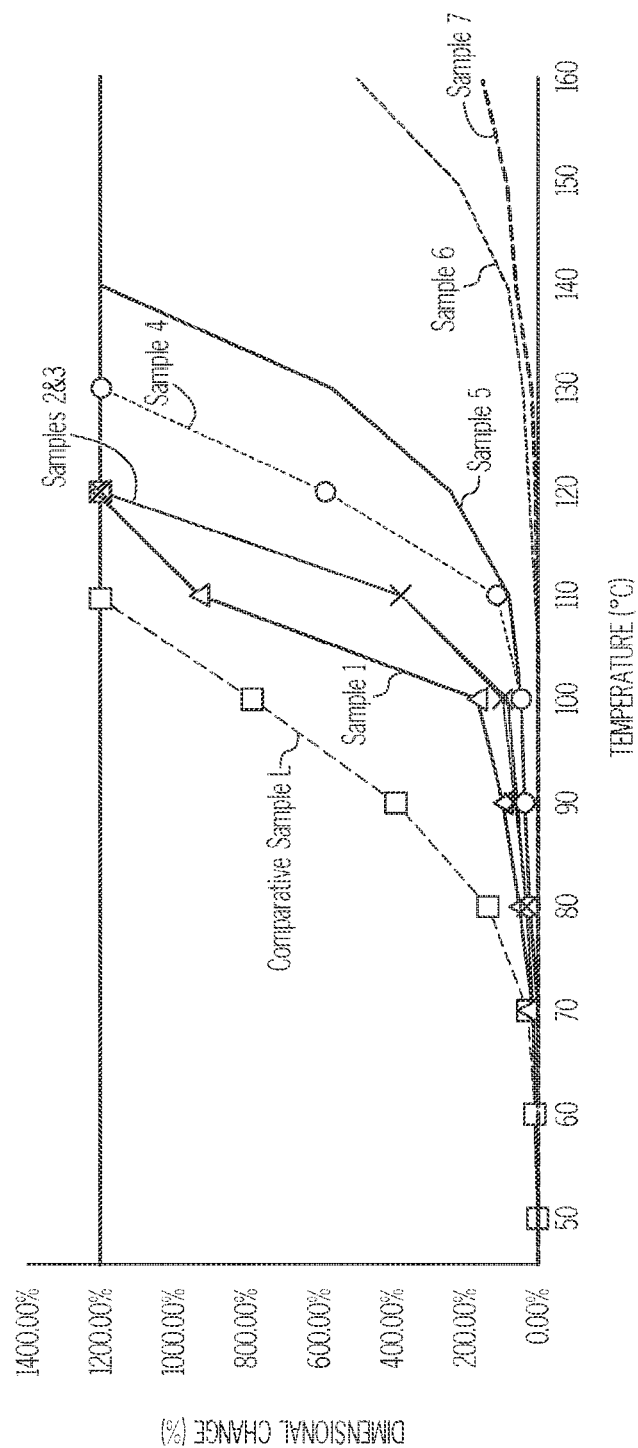
FIG. 2 is a graph of the dimensional change (y-axis; %) of Comparative Sample L and Samples 1-7 over a temperature of from 50° C. to 160° C. with a load of 100 g.

As seen in FIGS. 1 and 2, Samples 1-7 including the $Al^{3+}$ cation exhibit much smaller dimensional change as compared to Comparative Sample L, and the on-set creep temperature is also much higher. Accordingly, thermal creep resistance is improved by incorporating the $Al^{3+}$ cation.

Example 3

Creep resistance at a constant temperature was then measured for Comparative Sample L and Samples 6 and 7. The results for the test at 50° C. with a deadload of 400 g at 600 kPa at 24 hours and 96 hours, the results for the test at 60° C. with a deadload of 400 g at 600 kPa at 24 hours and 48 hours, and the results for the test at 50° C. with a deadload of 1000 g at 1500 kPa at 1 hour, 2, hours, 3 hours, 4 hours and 24 hours are presented in Table 5.

TABLE 5

Creep Resistance at Constant Temperature

| | Comparative Sample L | Sample 6 | Sample 7 |
|---|---|---|---|
| Dimensional change (%) with a deadload of 400 g, 600 kPa at 50° C. | | | |
| 24 hours | 150% | No Change | No Change |
| 96 hours | 475% | No Change | No Change |
| Dimensional change (%) with a deadload of 400 g, 600 kPa at 60° C. | | | |
| 24 hours | 625% | 12.50% | No Change |
| 48 hours | FAIL | 12.50% | No Change |
| Dimensional change (%) with a deadload of 1000 g, 1500 kPa at 50° C. | | | |

TABLE 5-continued

Creep Resistance at Constant Temperature

| | Comparative Sample L | Sample 6 | Sample 7 |
|---|---|---|---|
| 1 hour | FAIL | No Change | No Change |
| 2 hours | N/A | No Change | No Change |
| 3 hours | N/A | 6.25% | 6.25% |
| 4 hours | N/A | 12.50% | 6.25% |
| 24 hours | N/A | 25% | 12.50% |

As shown in Table 5, samples including the $Al^{3+}$ cation exhibit much smaller dimensional change as compared to Comparative Sample L, and creep resistance can be further improved by the increasing the $Al^{3+}$ amount added.

It is further noted that terms like "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

The invention claimed is:

1. A foam comprising an ionomer, wherein the ionomer comprises a neutralized blend of an ethylene acid copolymer and an aliphatic, mono-functional organic acid, wherein the blend consists of:
    from 40 to 95 wt % of the ethylene acid copolymer, based on the total weight of the blend, the ethylene acid copolymer being the polymerized reaction product of:
        ethylene, and
        from 1 to 25 wt % of monocarboxylic acid, based on the total weight of monomer present in the ethylene acid copolymer; and
        from 1 to 40 wt % of softening comonomer, based on the total weight of monomer present in the ethylene acid copolymer;
    from 5 to 50 wt % of the aliphatic, mono-functional organic acid, based on the total weight of the blend, wherein the aliphatic, mono-functional organic acid has fewer than 36 carbon atoms; and
    from 0 wt. % to 40 wt. % of additives selected from the group consisting of plasticizers, stabilizers, hydrolytic stabilizers, primary and secondary antioxidants, ultraviolet light absorbers, anti-static agents, dyes, pigments coloring agents, inorganic fillers, fire-retardants, lubricants, reinforcing agents, synthetic fiber or pulp, foaming or blowing agents, processing aids, slip additives, antiblock agents, release agents, tackifying resins, and inorganic fillers;
    wherein at least 70 mole % of total acid units are neutralized with a cation source comprising (a) a trivalent cation and (b) either a mono- or di-valent cation; and
    wherein at least 70 mol. % of the total acid units are neutralized with the trivalent cations.

2. The foam of claim 1, wherein the monocarboxylic acid comprises one or more of acrylic acid, methacrylic acid, or combinations thereof.

3. The foam of claim 1, wherein the softening comonomer is an alkyl acrylate selected from the group consisting of methyl acrylate, ethyl acrylate, n-butyl acrylate or iso-butyl acrylate, or combinations thereof.

4. The foam of claim 1, wherein the ionomer has a melt index, $I_2$, of 0.1 to 30 g/10 min, as determined in accordance with ASTM D1238 (220° C., 2.16 kg).

5. The foam of claim 1, wherein the ionomer has a density of 0.920 to 0.980 g/cc.

6. The foam of claim 1, wherein the mono- or di-valent cation is selected from the group consisting of a magnesium, sodium, zinc, lithium, and potassium cation.

7. The foam of claim 1, wherein the blend comprises from 60 to 80 wt % of the ethylene acid copolymer.

8. The foam of claim 7, wherein the blend comprises from 15 to 35 wt % of the aliphatic, mono-functional organic acid.

9. The foam of claim 1, wherein at least 90 mole % of total acid units are neutralized with a cation source comprising (a) a trivalent cation and (b) either a mono- or di-valent cation.

10. The foam of claim 9, wherein 100 mole % of the total acid units are neutralized using an amount of the cation source in excess of the amount required to neutralize 100% of the total acid units.

11. The foam of claim 1, wherein the foam exhibits a creep resistance as defined by a dimensional change of less than 50% at 100° C. under a load of 30 g at a stress of 46 kPa after 30 minutes.

12. The foam of claim 1, wherein the foam exhibits a creep resistance as defined by a dimensional change of less than 200% at 100° C. under a load of 100 g at a stress of 150 kPa after 30 minutes.

13. The foam of claim 1, wherein the foam exhibits a creep resistance as defined by a dimensional change of less than 15% at 100° C. under a load of 100 g at a stress of 150 kPa after 30 minutes.

14. The foam of claim 1, wherein the foam exhibits a creep resistance as defined by a dimensional change of less than 500% at 50° C. under a load of 400 g at a stress of 600 kPa after 96 hours.

15. The foam of claim 1, wherein at least 100 mole % of total acid units are neutralized with a cation source comprising (a) a trivalent cation and (b) either a mono- or di-valent cation.

16. The foam of claim 1, wherein at least 80 mol. (Original) % of the total acid units are neutralized with the trivalent cations.

17. The foam of claim 1, wherein at least 95 mol. % of the total acid units are neutralized with the trivalent cations.

18. The foam of claim 17, wherein from 10 to 55 mol. % of the total acid units are neutralized with the divalent cations.

19. A foam comprising an ionomer, wherein the ionomer comprises a neutralized blend of an ethylene acid copolymer and an aliphatic, mono-functional organic acid, wherein the blend comprises:
    from 40 to 95 wt % of the ethylene acid copolymer, based on the total weight of the blend, the ethylene acid copolymer being the polymerized reaction product of:
        ethylene, and
        from 1 to 25 wt % of monocarboxylic acid, based on the total weight of monomer present in the ethylene acid copolymer; and
        from 1 to 40 wt % of softening comonomer, based on the total weight of monomer present in the ethylene acid copolymer;
    from 5 to 50 wt % of the aliphatic, mono-functional organic acid, based on the total weight of the blend, wherein the aliphatic, mono-functional organic acid has fewer than 36 carbon atoms;
    wherein:

at least 90 mole % of total acid units are neutralized with a cation source comprising (a) a trivalent cation and (b) either a mono- or di-valent cation; and at least 80 mol. % of the total acid units are neutralized with the trivalent cations.

* * * * *